US009227573B2

(12) United States Patent
Hudspeth

(10) Patent No.: US 9,227,573 B2
(45) Date of Patent: Jan. 5, 2016

(54) FIREARM HOLSTER MOUNTING SYSTEM FOR VEHICLES

(71) Applicant: James Daniel Hudspeth, Arlington, TX (US)

(72) Inventor: James Daniel Hudspeth, Arlington, TX (US)

(*) Notice: Subject to any disclaimer, the term of this patent is extended or adjusted under 35 U.S.C. 154(b) by 0 days.

(21) Appl. No.: 14/201,898

(22) Filed: Mar. 9, 2014

(65) Prior Publication Data

US 2014/0183234 A1    Jul. 3, 2014

Related U.S. Application Data

(63) Continuation-in-part of application No. 12/687,120, filed on Jan. 13, 2010, now abandoned.

(51) Int. Cl.
| | |
|---|---|
| A47C 7/62 | (2006.01) |
| B60R 7/00 | (2006.01) |
| B60R 7/14 | (2006.01) |
| F41C 33/04 | (2006.01) |
| F41C 33/06 | (2006.01) |

(52) U.S. Cl.
CPC ............... *B60R 7/14* (2013.01); *F41C 33/041* (2013.01); *F41C 33/046* (2013.01); *F41C 33/06* (2013.01); *Y10T 29/49826* (2015.01)

(58) Field of Classification Search
CPC ................................. B60R 7/043; B60R 7/06
USPC ............ 297/188.06, 188.08, 188.121, 188.2; 224/275
See application file for complete search history.

(56) References Cited

U.S. PATENT DOCUMENTS

| | | | | |
|---|---|---|---|---|
| 3,167,182 | A * | 1/1965 | Calvin | 211/64 |
| 3,623,683 | A * | 11/1971 | Bennett | 244/122 A |
| 5,015,033 | A * | 5/1991 | Winters | 297/188.12 |
| 5,865,502 | A * | 2/1999 | Ayers et al. | 297/188.06 |
| 6,053,570 | A * | 4/2000 | Stern et al. | 297/188.08 |
| 6,405,909 | B1 * | 6/2002 | Burnett et al. | 224/275 |
| 7,338,131 | B2 * | 3/2008 | Forgatsch | 297/423.15 |
| 2004/0112931 | A1 * | 6/2004 | Swaim et al. | 224/585 |
| 2005/0173483 | A1 * | 8/2005 | Ravikumar et al. | 224/483 |
| 2006/0208025 | A1 * | 9/2006 | Grundy et al. | 224/666 |
| 2008/0047992 | A1 * | 2/2008 | Fabian | 224/275 |

* cited by examiner

*Primary Examiner* — Brian D Nash
*Assistant Examiner* — Derek Battisti
(74) *Attorney, Agent, or Firm* — Jeffrey Roddy

(57) ABSTRACT

A Firearm Holster Mounting System for Vehicles includes a mounting member which defines a hub for a plurality of overlapping holster mounting straps to secure the holster to the mount and a plurality of frame attachment straps for suspending the mount and holster beneath a vehicle seat. Adjustable length extension straps coupled to the holster mounting straps possess hooks for suspending the central mount to a vehicle seat base frame whereby the firearm is readily accessible from beneath the seat. The adjustable extension straps permit the mount to be laterally moved and secured at various positions beneath the vehicle seat as desired. At least one strap is provided to attach the mount to the seat base frame in a direction transverse that of the overlapping holster mounting straps.

6 Claims, 4 Drawing Sheets

FIREARM HOLSTER MOUNTING SYSTEM FOR VEHICLES

CROSS-REFERENCE TO RELATED APPLICATIONS

This application is a Continuation-in-Part of U.S. application Ser. No. 12/687,120 filed Jan. 13, 2010 which is incorporated by reference herein in its entirety.

BACKGROUND OF THE INVENTION

This invention relates generally to accessories for firearms, and more particularly to an adjustable firearm holster mount for securing a firearm holster in the limited confines beneath the seat of a vehicle.

Laws for carrying firearms both on the person and inside a vehicle allow citizens in many states to be in lawful possession of loaded firearms. However, few places within a vehicle are suitable for safely securing the weapon for transit while ensuring that the weapon is readily available for use at a moment's notice.

There are several types of holsters available on the market ranging in shape and size and having different classifications. Some holsters ride on a belt and are primarily used by law enforcement and military. Being exposed, these holsters are not suitable for use with concealed carry permits available in most states in the U.S. A second type of holster is known as "Inside The Waistband," (ITW). This holster is a favorite among concealed carry permit holders since it allows the firearm to be concealed easily. Holster types come in many shapes and sizes to fit different types of handguns and are good for carrying the firearm when walking around. However, when seated in a vehicle, a holster becomes uncomfortable and the firearm inaccessible due to space constraints and use of seat belts.

Most vehicles today have some space underneath the front driver seat. This area is sometimes used for stereo equipment or to store front visors for the windshield. Many citizens choose to keep a firearm inside their automobile for personal protection and concealed carry permit holders frequently choose to have a firearm on their person for protection. In a vehicle the firearm must be stowed or tucked away which risks damage or impairs firearm accessibility due to the many of storage constraints.

Prior storage solutions fail to deal with possible situations requiring rapid tactical deployment of the firearm.

It is an object of the invention to provide a means to safely secure a firearm holster under the seat of a vehicle.

It is another object of the invention to provide an adjustable mechanism to attach the holster to a wide variety of automotive seats and allow for left or right as well as front to back accessibility.

It is another object of the invention to provide a means to quickly retrieve the firearm from the holster and replace the firearm into the holster.

It is another object of the invention to provide an easy means to adjust the position of holster to place the firearm in a convenient position.

It is another object of the invention to provide a way to secure virtually any type of belt loop holster or ITW holster to the central mounting hub and provide a platform to mount any type of handgun.

It is another object of the invention to provide an easy way to install the device into automobiles by means of adjustable straps and easy to install hooks or looping straps that can attach in many different ways.

It is another object of the invention to provide an out of site holster location for the firearm to keep the firearm concealed in the vehicle, while still being readily available.

BRIEF SUMMARY OF THE INVENTION

The firearm holster mounting system includes a mounting member adapted to receive and secure a firearm holster, with adjustable length web straps and seat hooks which allow a belt type holster to be mounted in a secure way. The system is intended to allow a belt holster or other type of holster to be attached and oriented on the mount so as to provide a right or left hand draw and suspend the holster via the mount directly under an automotive seat. The system stores the firearm securely for transport and permits quick retrieval of the firearm in case of a threat of eminent danger.

The firearm holster mounting system for vehicles can be installed on virtually any type of front car seat that has sufficient room for the holster. A mounting hub is attached to the underside of the seat with at least three strap attachment points to provide a solid mounting point. A preferred embodiment comprises a sufficiently stiff low profile mounting member for securing the firearm holster thereto with a belting type mechanism that is adjustable front to back. Attachment points for the mounting member are readily accessible for additional adjustment. The mounting member comes with attachment straps that include relatively short sections affixed to the mounting member for quick release of the mounting member, and, longer length adjustable sections for attachment to sub seat structures. A rear attachment strap can be permanently affixed to the mounting member; in which case it includes a quick release mechanism for the adjustable strap. A hook is affixed to the distal end of each length adjustable strap to facilitate strap attachment to seat frame structures. The hooks are of any material sufficient to hold the weight of a firearm and provide easy mounting and dismounting from the seat structures. The hooks can attach to a variety of points; e.g., under the front seat of an automobile. In addition to, or in place of the hooks, a magnetic attachment member can be provided to attach to the metal plate type front seats on newer vehicles.

BRIEF DESCRIPTION OF THE SEVERAL VIEWS OF THE DRAWINGS

For a more complete understanding of the present invention, and the advantages thereof, reference is now made to the following descriptions and accompanying drawing figures.

DETAILED DESCRIPTION OF THE INVENTION

Figure 1:
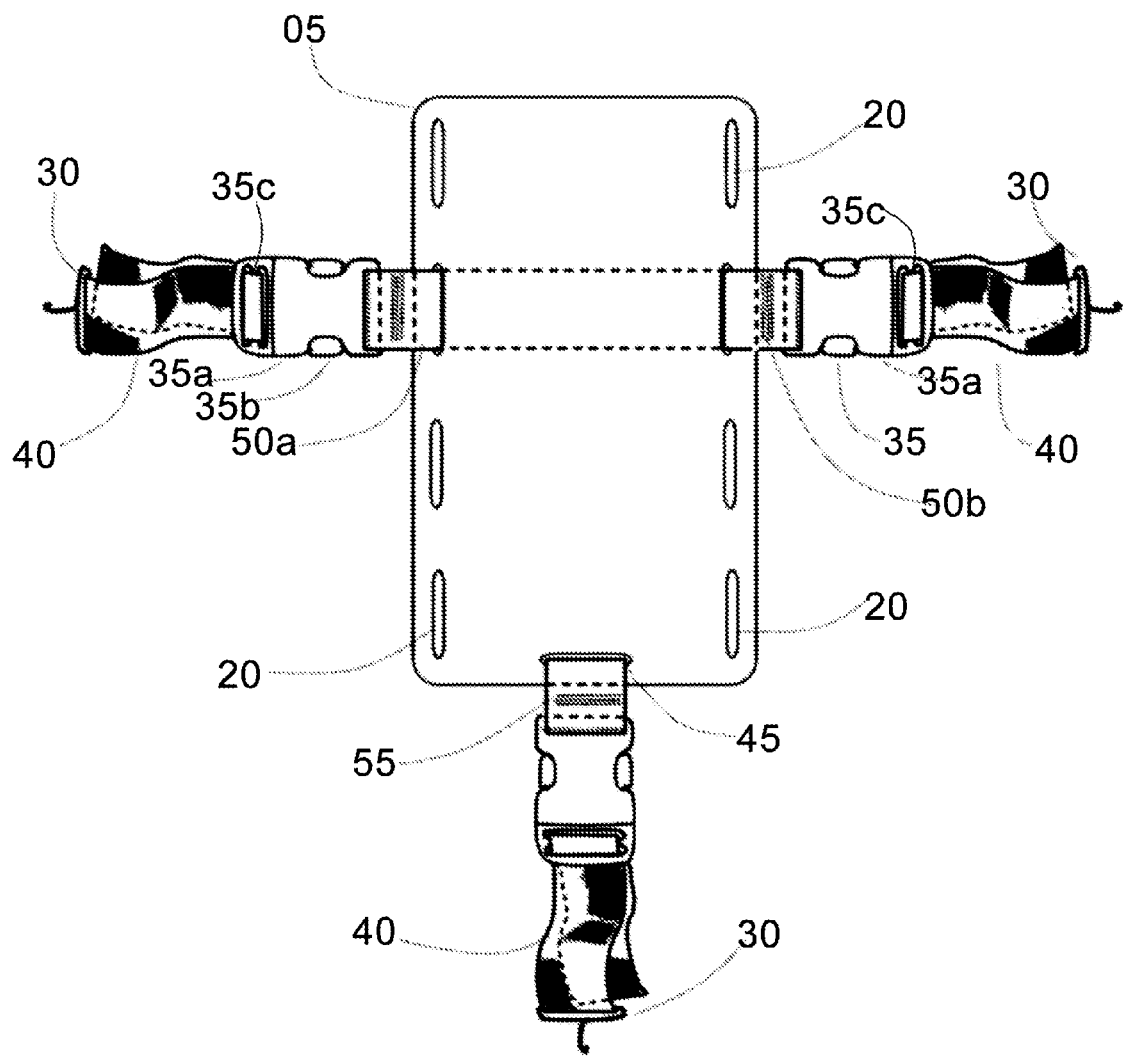
FIG. 1 in a top plan view, depicts a preferred embodiment according to the present invention including a system with attachment straps and without a holster attached for a particular firearm.

Reference Listing 05 mounting member
20 side slot
30 hook
35 quick release buckle
35a female connector
35b release
35c male connector
40 strap
45 slot
50a hook fastener
50b loop fastener
60 holster binding strap
61 D-ring
62 overlapped strap pair
100 holster
105 holster opening
106 holster closed end
110 firearm
120 seat
123 seat base
124 seat legs
125 seat base frame Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-5, the present invention includes a system for compactly and accessibly attaching a firearm securely beneath a vehicle seat.

Figure 1A:
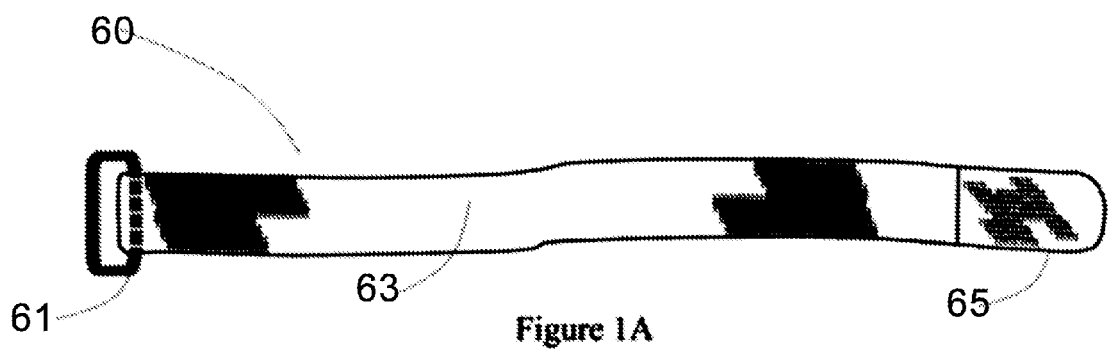
FIG. 1A depicts a typical holster mounting strap with hook-and-loop and D-ring ends.

FIG. 1 is a top plan view of a preferred embodiment with the main section defining a holster mounting member 05. While the mounting member in the particular embodiment depicted is substantially planar, some curvature may result from binding and securing a holster thereto. The mount can be made of any material sufficient in strength such as leather or plastic. Accordingly, mounting member 05 is intended to be as practically low profile as possible in accordance with other features and aspects of the present invention while possessing sufficient stiffness to secure a holster 100 and firearm 110. Slots 20 are located on at least three sides of mounting member 05. At one end of the mounting member, a first length of short nylon webbing strap 55 is attached by a loop to slot 45 and terminates in a female connector portion 35a of a quick release buckle. A second length of strapping 40 is reversibly couplable to the female connector and possesses a hook 30 at its distal end which is adapted to attach to structures of a vehicle seat base frame 124, 125. Straps 60 (FIGS. 1A, 2) run transversely relative to strap 55 and are threaded through slots 20 in order to adjustably overlap and fasten to each other via mating hook-and-loop fasteners on their surface. The length of each connected strap pair 62 can be adjusted to accommodate various girths of holsters. While in the particular embodiment shown, there are preferably four side slots on opposite sides of the mount 05 through which opposing straps 60 are threaded in order to overlap one another and the holster and thereby bind it securely to the mounting member, the number of slots can vary. Preferably, each of the connected strap pair has either a hook fastener or a loop fastener or a combination thereof on its surface whereby the straps are reversibly attached over a holster body 100. This arrangement of hook-and-loop fasteners can be seen in (FIG. 1A) wherein strap 60 includes a length of loop fastener 63 connected to D-ring 61, and a section of hook fastener 65 at one end. Preferably, the topmost strap of the mounting member is placed through a belt loop of the holster to aid in holster retention.

A frame attachment hook 30 is attached to one end of strap webbing 40 and the other end of the strap looped through a male connector 35c reversibly couplable to a female connector 35a of quick release buckle which is reversibly couplable to a strap 60.

Figure 5:
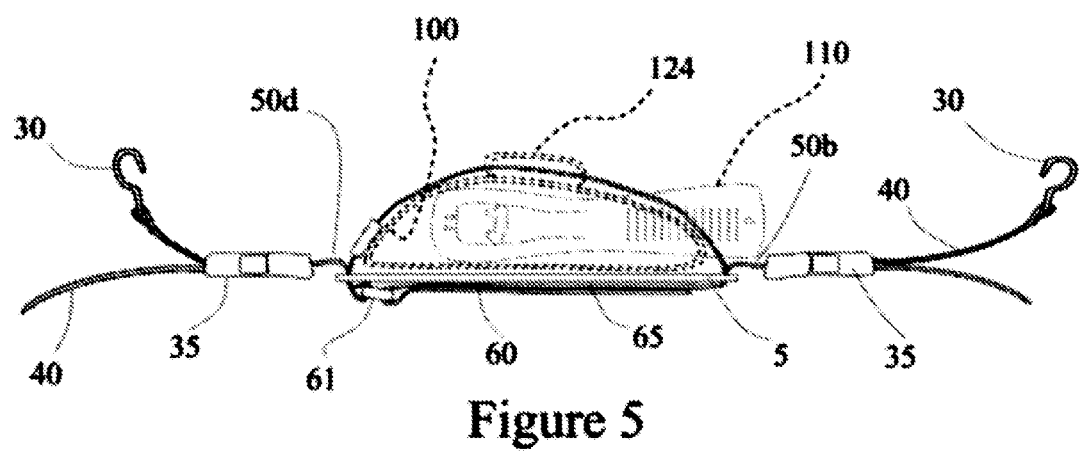
FIG. 5 is an end view of the present invention suspended beneath and viewed from the front edge of the seat base of the vehicle seat of (FIG. 3).
Figure 4:
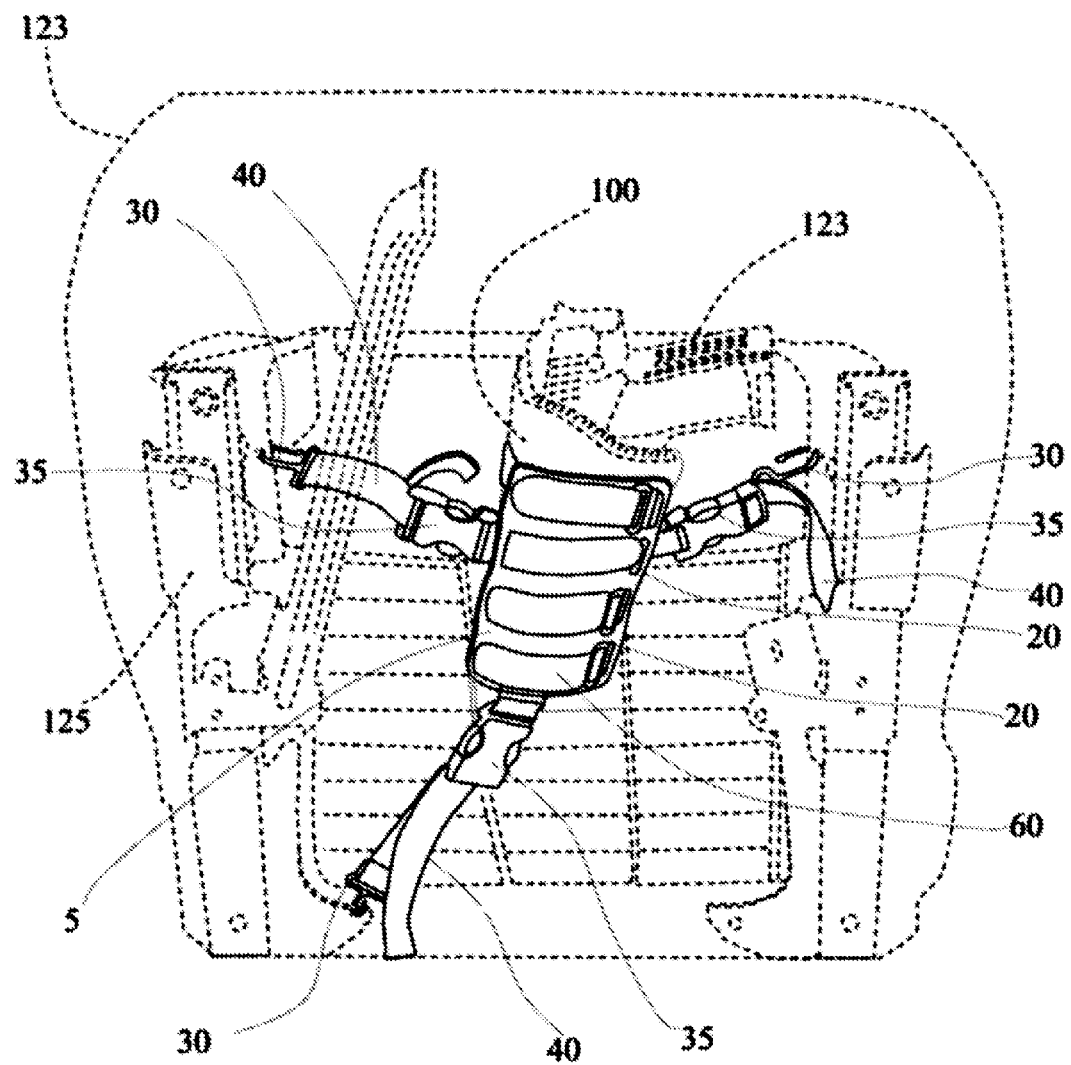
FIG. 4 is a bottom plan view of the vehicle seat of (FIG. 3) with the present invention of (FIGS. 1 and 2) attached to the frame of the seat base.

Slots 20 are available for various universal fit capabilities. Since the hook-and-loop fasteners can be released and the length of each combined strap pair adjusted, the firearm holster may be positioned in either a high profile configuration with the holster opening above the topmost edge of mount 05 (FIG. 4) for maximum accessibility, or a low profile configuration below the topmost edge of mount 05 for maximum concealment under the seat. The locations of slots 20 along the side of the mount 05 provide for forward and rear mounting of the holster for proper positioning. Referring to FIGS. 4 and 5, straps 60 secure a belt holster 100 of choice to mount 05 by adjusting the strap pair length and overlapping the holster.

Side to side adjustment relative to seat frame 125 is accomplished by letting out or taking up slack from the length of nylon webbing 40 cinchably attached to the male portion of the quick release buckle.

The quick release buckles 35 permit the mount and a firearm and holster, if one is present, to be removed quickly. Once installed to the underside of a front car seat with the side hooks tightened, it is difficult to remove the mount without uncoupling the quick release buckles.

Figure 2:
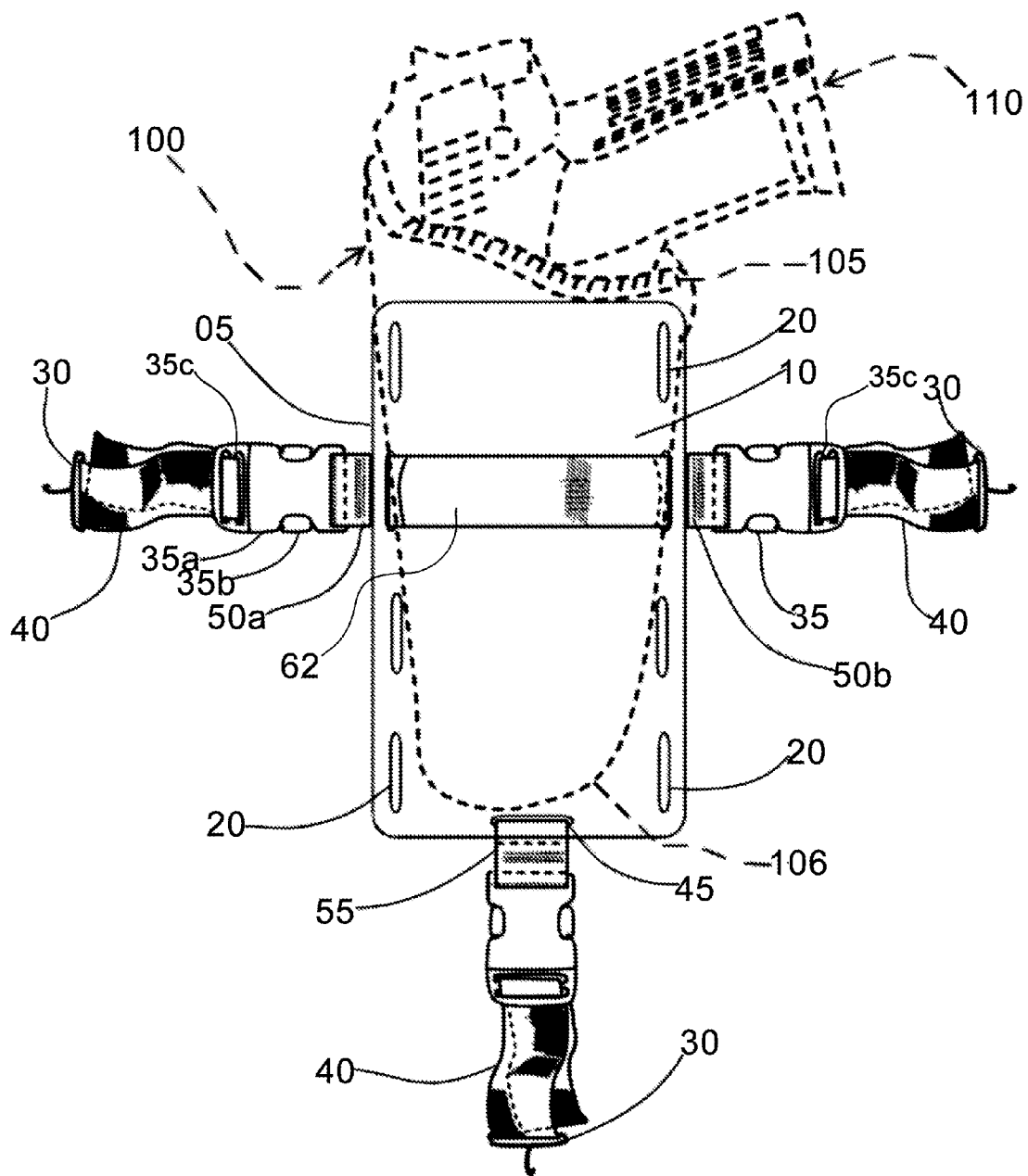
FIG. 2 is a bottom plan view of a preferred embodiment with any additional features identified and showing a handgun and holster mounted to mounting member 05.
Figure 3:
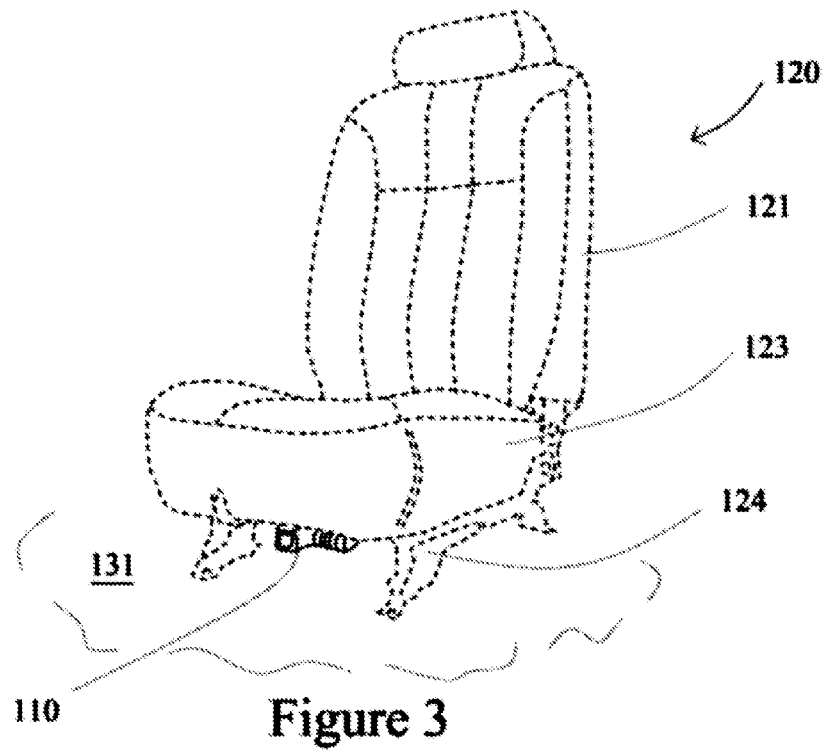
FIG. 3 shows a typical vehicle seat with which the present invention cooperates, and shows a handgun mounted under the front edge of the seat base as positioned using the present invention.

Moving to FIG. 2 which is a bottom plan view showing the connected strap pair across mount 05, the hook-and-loop fasteners 50a, 50b on straps 60 can be disconnected, the straps removed and re-threaded through any of the side slots 20. When the Firearm Holster Mounting System is installed into the vehicle (FIG. 4), this bottom side as shown in (FIG. 2) is the side that faces down at the bottom of seat base 123, serving as a sling for supporting holster 100 under front seat 120.

While the invention has been described by the embodiments given, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A system for safely and securely mounting a firearm holster in a horizontal disposition under the seat of a vehicle comprising:
   (1) a low profile mounting member with a front face, a back face, and, a perimeter with apertures thereabout, (2) a first set of straps for suspending the mounting member under a vehicle seat wherein each strap of the first set has a quick release buckle, and a strap extension portion for connection to a vehicle seat base frame, (3) a second set of straps for retaining the holster against the mounting member at least by overlapping the holster wherein the straps are adapted to force the mounting member into pliant contact against contours on one side of the holster and to snugly conform to contours on an opposite side of the holster when the second set of straps is tightened and forced thereagainst and configured to permit a firearm to be rapidly and freely drawn from the horizontally mounted and retained holster.

2. The system according to claim 1 further comprising at least one overlapped strap.

3. The firearm holster mounting system according to claim 1 further comprising at least one strap that does not overlap.

4. The firearm holster mounting system according to claim 1 wherein the straps of the first set include an extension strap reversibly couplable to each fastening strap for attaching the mounting member to a vehicle seat base frame.

5. The firearm holster mounting system according to claim 1 wherein the holster and firearm can be secured at various longitudinal positions on the mounting member.

6. The firearm holster mounting system according to claim 1 wherein the mounting member can be adjustably positioned at various sub-seat locations by adjusting the lengths of the strap extensions.

\* \* \* \* \*